(12) United States Patent
Hidaka

(10) Patent No.: US 7,494,281 B2
(45) Date of Patent: Feb. 24, 2009

(54) SLIDE TYPE GUIDE MECHANISM

(75) Inventor: Toshiaki Hidaka, Tokyo (JP)

(73) Assignee: Nitto Kohki Co., Ltd., Tokyo (JP)

( * ) Notice: Subject to any disclaimer, the term of this patent is extended or adjusted under 35 U.S.C. 154(b) by 0 days.

(21) Appl. No.: 11/827,773

(22) Filed: Jul. 12, 2007

(65) Prior Publication Data

US 2008/0008547 A1    Jan. 10, 2008

Related U.S. Application Data

(63) Continuation of application No. PCT/JP2006/300052, filed on Jan. 6, 2006.

(30) Foreign Application Priority Data

Jan. 13, 2005    (JP)    ............................. 2005-006035

(51) Int. Cl.
*F16C 29/10* (2006.01)
*F16C 29/02* (2006.01)
*B23B 29/00* (2006.01)

(52) U.S. Cl. .............................. 384/39; 384/40; 384/45; 408/97; 408/100; 408/110; 408/119

(58) Field of Classification Search .................... 384/26, 384/37, 39–40, 42, 45, 49; 408/56, 76, 99, 408/110–112, 238, 97–100, 119
See application file for complete search history.

(56) References Cited

U.S. PATENT DOCUMENTS

| | | | | |
|---|---|---|---|---|
| 1,285,628 A | * | 11/1918 | Craley | .......................... 384/39 |
| 1,994,747 A | * | 3/1935 | Bishop et al. | .......... 137/115.15 |
| 2,472,967 A | * | 6/1949 | Goldberg | ...................... 408/56 |

(Continued)

FOREIGN PATENT DOCUMENTS

DE    2710561 A * 9/1935

(Continued)

OTHER PUBLICATIONS

Taiwan IPO Search Report dated Feb. 28, 2007 for Taiwanese Patent Application No. 095100913.

(Continued)

*Primary Examiner*—Marcus Charles
(74) *Attorney, Agent, or Firm*—Brinks Hofer Gilson & Lione

(57) ABSTRACT

A slide type guide mechanism in which an adjusting screw member for eliminating looseness can be automatically tightened. The slide type guide mechanism includes a guide 22 which is provided with a guide groove 30 having a first guide side surface 26 and a second guide side surface 28 extending along straight lines parallel to each other, a threaded hole extending from an outer side surface of the guide toward the guide groove through the first guide side surface 26, a slide 24 which is guided by the guide groove, a screw member threadably engaged in the threaded hole and rotated so as to urge the slide in a direction from the first guide side surface toward the second guide side surface of the guide groove, a torque applying device 54 having a spring for applying to the screw member a torque by which the screw member is rotated so as to move toward the guide groove.

10 Claims, 4 Drawing Sheets

U.S. PATENT DOCUMENTS

| | | | |
|---|---|---|---|
| 3,198,588 A | | 8/1965 | Cashman et al. |
| 3,248,974 A | * | 5/1966 | Alexander .................. 408/130 |
| 3,702,716 A | * | 11/1972 | Decker ........................ 384/39 |
| 3,864,053 A | * | 2/1975 | Harwood .................... 408/110 |
| 4,033,539 A | * | 7/1977 | Bardocz .................. 248/228.6 |
| 4,080,092 A | * | 3/1978 | Hudson ...................... 408/110 |
| 4,300,271 A | * | 11/1981 | Wohlhaupter ................ 384/59 |
| 4,504,096 A | * | 3/1985 | Roch ........................... 384/39 |
| 4,941,758 A | * | 7/1990 | Osawa ......................... 384/40 |
| 5,297,873 A | * | 3/1994 | Komiya ....................... 384/45 |
| 5,899,644 A | * | 5/1999 | Buck et al. ................... 408/97 |
| 6,179,468 B1 | * | 1/2001 | Thorstens et al. ............. 384/40 |
| 6,237,453 B1 | | 5/2001 | Snow et al. |
| 6,799,387 B2 | * | 10/2004 | Pippins ....................... 37/456 |

FOREIGN PATENT DOCUMENTS

| | | | |
|---|---|---|---|
| JP | 60-060068 U | | 4/1985 |
| JP | 07-224835 | | 8/1995 |
| JP | 2863087 | | 3/1999 |
| JP | 2002195130 A | * | 7/2002 |
| JP | 2003-042154 | | 2/2003 |
| JP | 2004330376 A | * | 11/2004 |
| TW | 193921 A | | 11/1992 |
| TW | 417524 A | | 1/2001 |

OTHER PUBLICATIONS

Chinese Office Action issued Oct. 24, 2008 in Chinese patent application No. 200680005384.X (with translation) 6 pages.

* cited by examiner

PRIOR ART

PRIOR ART

SLIDE TYPE GUIDE MECHANISM

CROSS REFERENCE TO RELATED APPLICATION

This application is a continuation of PCT/JP2006/300052, filed Jan. 6, 2006, which claims priority to Japanese Application No. JP2005-006035 filed Jan. 13, 2005. The entire contents of these applications are incorporated herein by reference.

TECHNICAL FIELD

The present invention relates to a slide type guide mechanism used for guiding, for example, an electric drill with respect to a support frame in an electric drill unit.

BACKGROUND ART

FIG. 1 shows a conventional electromagnetically-fixable electric drill unit. The electromagnetically-fixable electric drill unit has an electromagnetic base 2 at the bottom of a support frame 1 thereof. The drill unit is mounted on a workpiece by an attracting force of the electromagnetic base. The support frame 1 supports an electric drill 4 so that the electric drill is vertically moved by rotating a handle 5. The electric drill 4 has a drill motor 6 and an arbor 8 rotatably driven by the motor, and an annular cutter 10 is secured to the arbor. The electric drill 4 is provided with a tank 12 for storing cutting oil to be supplied to the annular cutter 10.

FIG. 2 is a plan view of the electric drill unit. Here, the handle 5, the tank 12 and some other elements are omitted. As shown, the electric drill 4 is adapted to be guided by means of a dovetail-shaped linear guide mechanism 11 so as to move vertically with respect to the support frame 1. Specifically, the electric drill 4 is provided with a slide plate 19 having a sliding portion 13 which slidably engages with a dovetail-shaped guide groove 15 of a guide secured to the support frame 1.

However, this type of guide mechanism has a tendency to become difficult to properly guide the electric drill 4 in the vertical direction due to looseness caused by wear thereof, thereby hindering cutting operation.

Therefore, conventionally, the guide is provided with threaded holes arranged at appropriate intervals in the longitudinal direction of the guide and extending from a side surface of the guide to the guide groove 15, and adjusting screws 16 (see FIG. 1) are threadably engaged with the threaded holes. Thus, if looseness is generated, these adjusting screw members are tightened to eliminate the looseness. Alternatively, the support frame 1 is provided with a bracket 14 for rotatably holding the arbor 8. Thus, even if looseness is generated in the guide mechanism 11, the arbor 8 and the annular cutter 10 attached thereto can be prevented from wobbling (see Japanese Patent No. 2863087).

In a case in which the bracket 14 is provided for preventing wobbling of the arbor, however, an oil supply pipe 17 extending from the tank 12 to supply cutting oil to the annular cutter 10 has to be connected to the upper end of the arbor 8 (see FIGS. 1 and 3). In this case, the distance from the upper end of the arbor where the cutting oil is supplied to cutting teeth at the distal end of the annular cutter 10 is large. As a result, the cutting oil cannot be adequately supplied to the cutting teeth when the electric drill unit is used in a tilted manner in order to drill a hole in a wall or the like.

DISCLOSURE OF THE INVENTION

Problems to be Solved by the Invention:

In view of the above-described problems, it is an object of the present invention to eliminate looseness in a slide type guide mechanism by means of an adjusting screw member similar to the above-described one and, more particularly, to automatically tighten the adjusting screw member for eliminating the looseness, thereby simplifying the maintenance of the slide type guide mechanism.

Further, it is another object of the present invention to improve the slide type guide mechanism, thereby solving the above-described problems in an electric drill unit.

Means for Solving the Problem:

The present invention provides a slide type guide mechanism including:
  a guide provided with a guide groove having a first guide side surface and a second guide side surface extending along straight lines parallel to each other;
  a slide having a sliding portion slidably engaged with the guide groove, the sliding portion having a first sliding side surface and a second sliding side surface facing to and extending along the first guide side surface and the second guide side surface, respectively, of the guide groove of the guide; and,
  a looseness preventing unit for preventing looseness from being generated between the guide groove and the sliding portion, the looseness preventing unit including:
  a threaded hole extending from an outer side surface of the guide toward the guide groove (preferably, extending in a direction crossing the first and second guide side surfaces) through to the first guide side surface;
  a screw member threadedly engaged with the threaded hole and adapted to be rotated so as to move toward the guide groove to urge the slide in a direction from the first guide side surface toward the second guide side surface of the guide groove; and,
  a torque applying device having a spring for applying to the spring member a torque by which the screw member is rotated so as to move toward the guide groove.

Specifically, the torque applying device may include:
  a fixed support member which is fixed to the guide; and,
  a torsion coil spring for applying the torque to the screw member, the torsion coil spring being disposed around an axis of the screw member and connected at one end thereof to the fixed support member and at the other end thereof to the screw member.

The fixed support member may be fixed to the guide in a state in which the fixed support member is rotated about the axis of the screw member to tighten the torsion coil spring.

Further, the screw member may have an externally extending portion positioned outside the guide, wherein the fixed support member is disposed concentrically around the externally extending portion and the torsion coil spring is wound around the externally extending portion so as to be positioned between the externally extending portion and the fixed support member.

Furthermore, the fixed support member may have a fixing member which engages with the fixed support member and the guide to fix the fixed support member to the guide in a state in which the fixed support member is set at a required angle about the axis of the screw member.

The fixing member may have a pin attached to either the guide or the fixed support member, and a hole formed in the other and engaged with the pin.

Further, the externally extending member of the screw member may be provided at the end thereof with a locking member extending transversely with respect to the axis of the screw member and outside the externally extending member, and the fixed support member may have a retaining portion which engages with the locking member to stop the screw member from rotating about the axis of the screw member when the screw member is rotated a certain angle about the axis of the screw member by means of the torque.

Furthermore, the present invention also provides an electric drill unit including:
- a support frame;
- an electric drill supported by the support frame; and,
- a slide type guide mechanism as stated above for slidably guiding the electric drill with respect to the support frame, wherein the guide is secured to the support frame and the electric drill is secured to the slide.

The electric drill may include:
- an electric motor;
- an arbor having a distal end to which a cutting tool is attached and an axis about which the arbor is rotatably driven by means of the electric motor;
- a tank for storing cutting oil;
- an oil supply ring fixed to the support frame and disposed around the arbor at the distal end of the arbor or in the vicinity thereof such that the arbor can rotate; and,
- an oil supply unit for supplying the cutting oil from the tank via the oil supply ring into the arbor, the oil supply unit including;
- an oil supply hole in the oil supply ring which extends from the outer surface through the inner surface of the oil supply ring;
- an oil supply hole in the arbor which extends from the outer surface through the inner surface of the arbor;
- an oil supply pipe extending from the tank to the oil supply hole in the oil supply ring.

Advantageous Effects of the Invention:

As described above, the slide type guide mechanism according to the present invention comprises the torque applying device having the spring for applying to the screw member a torque by which the screw member is rotated so as to move toward the guide groove. Therefore, if looseness is generated by wear between the guide groove of the guide and the sliding portion of the slide, the screw member is rotated by means of the torque applying device so as to continuously urge the slide, whereby the problem caused by the looseness can be avoided.

Further, if the screw member is rotated a predetermined angle relative to the fixed support member due to occurrence of looseness and then the locking member of the screw member engages with the retaining portion of the fixed support member, a user notices that a torque applied to the screw member by means of the torsion coil spring has been reduced. The user then detaches the fixed support member from the guide and rotates the fixed support member relative to the screw member to tighten the torsion coil spring, and thereafter fixes the fixed support member to the guide again, whereby it is possible to apply a required torque to the screw member.

Furthermore, in the electric drill unit with the slide type guide mechanism, the electric drill slidably attached to the support frame of the electric drill unit is slidably guided without looseness with respect to the support frame by means of the slide type guide mechanism. As a result, there is no need for a bracket which is needed in the above-described conventional electric drill unit to hold the arbor at a predetermined position with respect to the support frame. Thus, the oil supply pipe extending from the cutting oil tank can be connected to the bottom of the arbor or in the vicinity thereof, whereas the oil supply pipe has to be connected to the upper end of the arbor in the conventional electric drill unit. Therefore, it is possible to supply cutting oil to the vicinity of a cutting tool attached to the bottom of the arbor. Accordingly, it is possible to efficiently and positively supply the cutting oil to cutting teeth at the distal end of the cutting tool even when the electric drill unit is used in a tilted manner in order to drill a hole in a wall or the like.

DETAILED DESCRIPTION OF THE PREFERRED EMBODIMENTS

An embodiment of a slide type guide mechanism according to the present invention will now be described with reference to the accompanying drawings.

Figure 4:
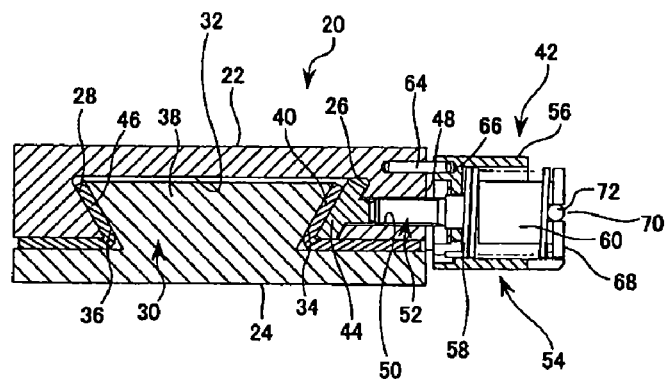
FIG. 4 is a cross-sectional view of a slide type guide mechanism according to the present invention.

FIG. 4 shows a slide type guide mechanism 20 according to the present invention. As shown in the figure, the guide mechanism 20 is composed of a guide 22 and a slide 24 which is slidably engaged with and guided by the guide 22.

The guide 22 has a guide groove 30 having a first guide side surface 26 and a second guide side surface 28 extending along straight lines (i.e., lines perpendicular to the paper surface in FIG. 4) parallel to each other. In the figure, the guide groove 30 is dovetail shaped. The first guide side surface 26 and the second guide side surface 28 extend from both edges of a groove bottom surface 32 formed therebetween such that the first and second guide side surfaces become closer to each other, as shown in the cross section in FIG. 4.

The slide 24 has a first sliding side surface 34 and a second sliding side surface 36 facing to and extending parallel to the first guide side surface 26 and the second guide side surface 28, respectively, of the guide groove 30 of the guide 22. The slide 24 also has a sliding portion 38 which is slidably engaged with the guide groove 30. In the example in the figure, a first slide member 40 and an urging member 44, which is one of elements of a looseness preventing unit 42 described later, are placed between the first guide side surface 26 and the first sliding side surface 34. A second slide member 46 is placed between the second guide side surface 28 and the second sliding side surface 36.

The looseness preventing unit 42 has a threaded hole 50 extending from a side surface 48 to the first guide side surface 26 of the guide 22, and a screw member 52 inserted into the threaded hole from the side surface 48 and threadably engaged with the threaded hole. The screw member 52 is adapted to urge the slide 24 in a direction from the first guide side surface 26 toward the second guide side surface 28 of the guide groove 30, thereby preventing looseness between the guide groove 30 and the sliding portion 38.

The looseness preventing unit 42 further has a torque applying device 54 for applying to the screw member 52 a torque by which the screw member 52 is rotated so as to move toward the guide groove 30.

Specifically, the torque applying device 54 has a fixed support member 56 which is fixed to the guide 22, and a torsion coil spring 58 disposed around an axis of the screw member 52. The torsion coil spring 58 is connected at one end thereof to the fixed support member 56 and at the other end thereof to the screw member 52 so that the torsion coil spring 58 applies a torque to the screw member 52.

The screw member 52 has a cylindrical-shaped externally extending portion 60 positioned outside the guide 22. The fixed support member 56 is a tubular member disposed concentrically around the externally extending portion 60. The torsion coil spring 58 is wound around the externally extending portion 60 so as to be positioned between the externally extending portion 60 and the fixed support member 56.

The fixed support member 56 is adapted to be able to be fixed to the guide 22 in a state in which the fixed support member 56 is rotated about the axis of the screw member 52 to tighten the torsion coil spring 58. In other words, the guide 22 is provided on the side surface 48 thereof with a pin 64 projecting from the side surface, and the fixed support member 56 is provided on the surface thereof facing to the side surface 48 with a plurality of holes 66 arranged on an arc about the axis of the screw member. Thus, the pin 64 engages with any one of the holes 66, whereby the fixed support member 56 is fixed to the guide 22.

Figure 5:
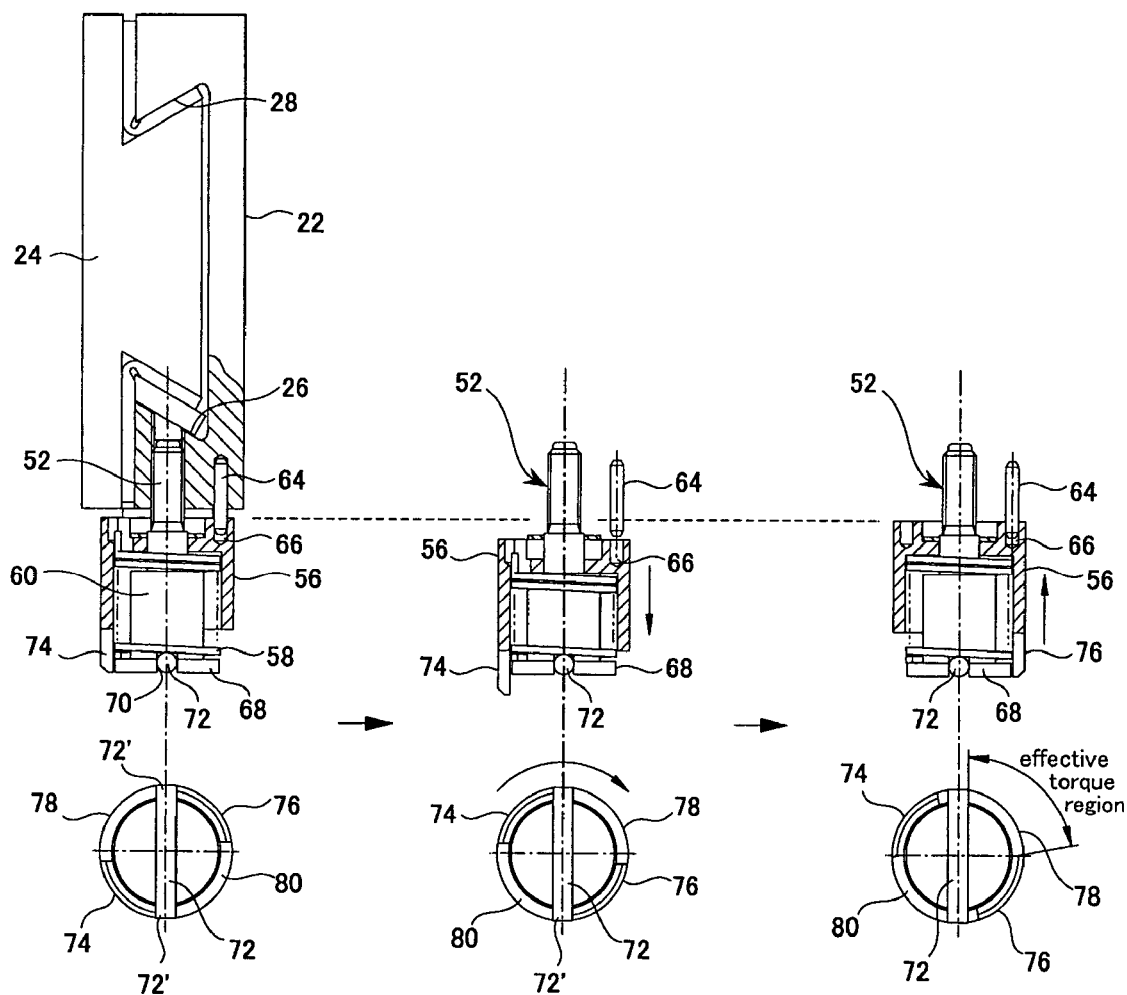
FIG. 5 is a view for explaining the operation of a torque applying device of the slide type guide mechanism in FIG. 4.

The externally extending portion 60 of the screw member 52 is provided at the outer end thereof with a disk-shaped member 68. As shown in FIGS. 4 and 5, the disk-shaped member 68 has a groove 70 extending in a diameter direction thereof. The groove 70 is adapted to be detachably engaged by a pin-shaped locking member 72 having a length the same as the outer diameter of the fixed support member 56. The tubular fixed support member 56 has a pair of retaining portions 74, 76 extending from the end thereof in the axial direction thereof. Each of the retaining portions circumferentially extends within a range of approximately 90 degrees. Between the retaining portions 74 and 76, concave portions 78, 80 are formed in which the opposite ends 72', 72' of the locking member 72 are received, respectively.

In the above-described slide type guide mechanism, if wear occurs at the contact portion between the guide groove 30 of the guide 22 and the sliding portion 38 of the slide 24, the screw member 52 is rotated (in the clockwise direction as viewed in FIG. 5) about the axis thereof by means of the torsion coil spring 58. Thus, the screw member 52 is advanced by an amount corresponding to the wear of the guide groove 30 and the sliding portion 38, whereby the looseness between the guide groove 30 and the sliding portion 38 is eliminated.

When the screw member is rotated and then the both ends 72', 72' of the locking member 72 come into engagement with the retaining portions 74, 76 of the fixed support member as shown in the lower left of FIG. 5, a user pulls the fixed support member 56 away from the guide 22 to detach the fixed support member 56 from the pin 64 as shown in the upper center of FIG. 5. Then, after rotating the fixed support member 56 clockwise approximately 90 degrees to tighten the torsion coil spring 58 as shown in the lower center of FIG. 5, the user moves the fixed support member 56 toward the guide 22 to engage an appropriate one of the holes 66 formed in the fixed support member 56 with the pin 64 as shown in the upper right of FIG. 5, thereby fixing the fixed support member 56 to the guide 22 (see the upper right of FIG. 5).

Figure 1:
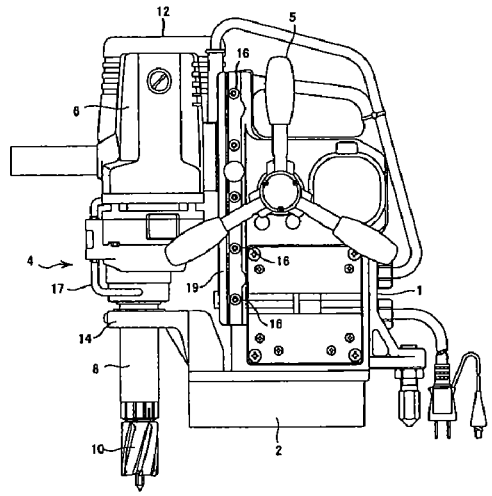
FIG. 1 is a side view of a conventional electric driver device.
Figure 2:
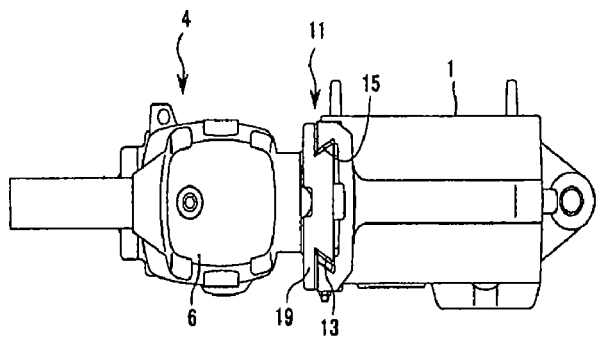
FIG. 2 is a plan view of the conventional electric driver device.
Figure 3:
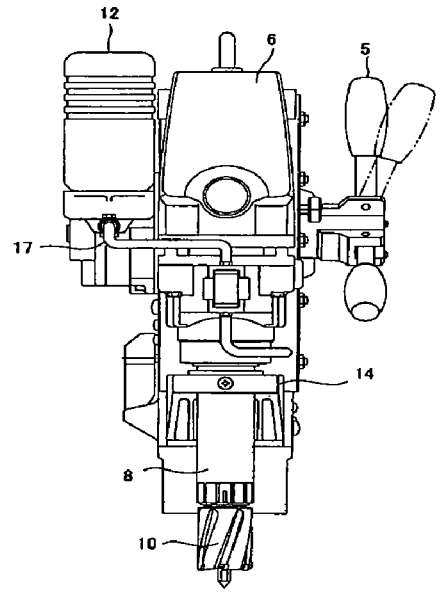
FIG. 3 is a front view of the conventional electric driver device.
Figure 6:
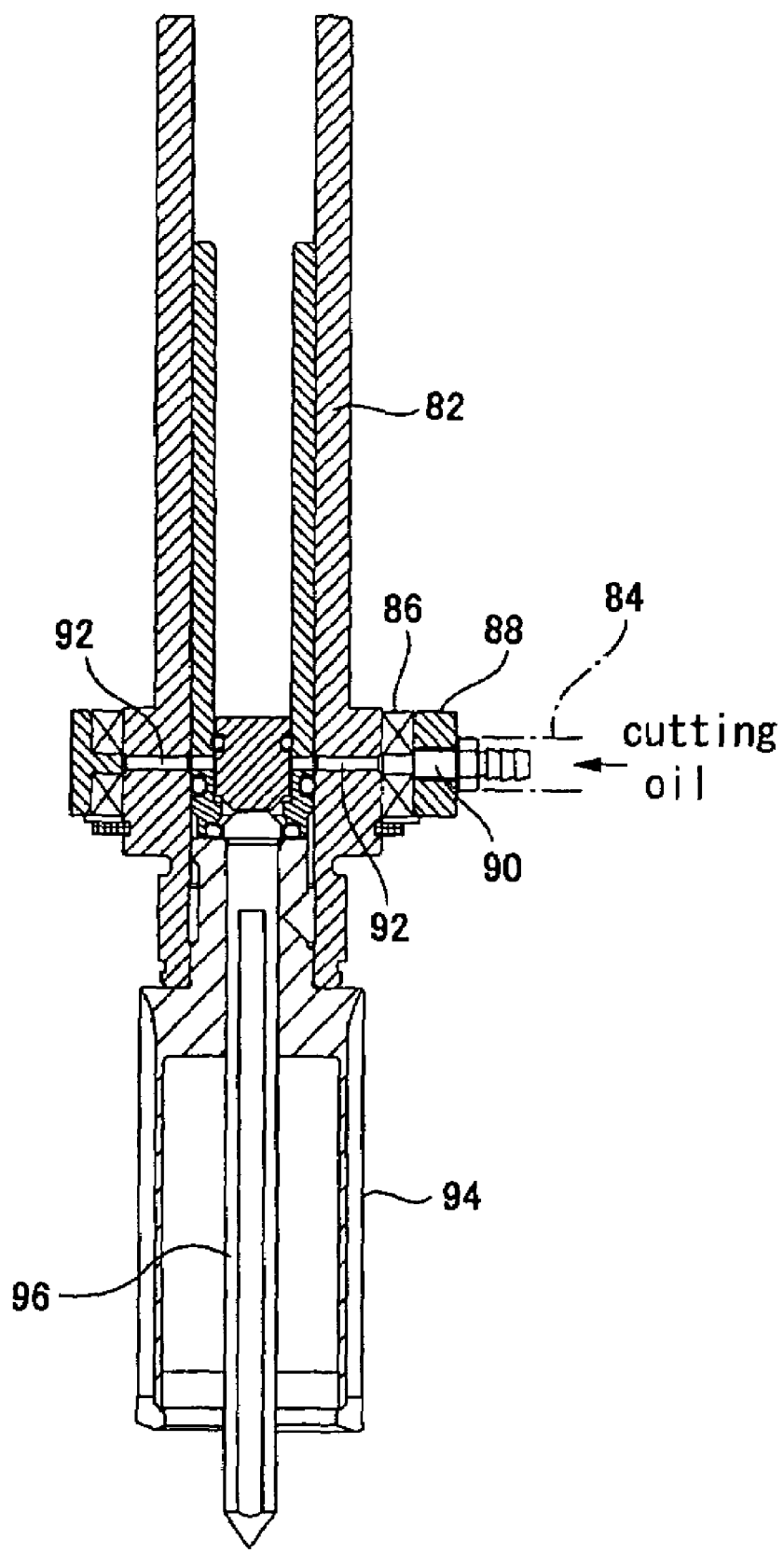
FIG. 6 is a view showing a state in which a cutting oil pipe is connected to an arbor in an electric driver device equipped with the slide type guide mechanism according to the present invention.

FIG. 6 shows a state in which a cutting oil supply pipe 84 is connected to an arbor 82, in a case in which the above-described slide type guide mechanism is applied to the conventional electric drill unit described above with reference to FIGS. 1 to 3 to prevent looseness of the electric drill with respect to the support frame and in which the bracket which is used for holding the arbor in the conventional electric drill unit is removed. In this arbor, an oil supply ring 88 is disposed around the bottom portion thereof through the intermediary of a seal ring 86, and the oil supply pipe 84 is connected to the oil supply ring 88. The oil supply ring 88 and the seal ring 86 are provided with an oil supply hole 90 communicating with the oil supply pipe 84. The oil supply hole communicates with to an annular oil supply path formed around the outer periphery of the arbor. The annular oil supply path communicates with the inside of the arbor via a plurality of oil supply paths 92 radially extending through the arbor 82. Cutting oil is supplied from the oil supply pipe 84 to the inside of the arbor, and moves along the inner surface of the arbor and a center pin 96 of an annular cutter 94 connected to the arbor. Then, the cutting oil is supplied to a surface of a workpiece, thereby reaching cutting teeth at the distal end of the annular cutter 94. The cutting oil may be supplied by means of a pump so that it can be supplied regardless of the vertical position of the tank when the electric drill unit is used in a tilted manner.

Although the embodiment of the present invention has been described above, the present invention is not necessarily limited to the foregoing embodiment. For example, the guide groove of the guide is not necessarily limited to a dovetail-shaped groove.

The invention claim is:

1. A slide type guide mechanism comprising:
    a guide with a guide groove having a first guide side surface and a second guide side surface extending along straight lines parallel to each other;
    a slide having a sliding portion slidably engaged with the guide groove, the sliding portion having a first sliding side surface and a second sliding side surface facing to and extending along the first guide side surface and the second guide side surface, respectively, of the guide groove of the guide; and,
    a looseness preventing unit for preventing looseness from being generated between the guide groove and the sliding portion, the looseness preventing unit comprising:
    a threaded hole extending from an outer side surface of the guide toward the guide groove through the first guide side surface;
    a screw member threadedly engaged with the threaded hole and adapted to be rotated so as to move toward the guide groove to urge the slide in a direction from the first guide side surface toward the second guide side surface of the guide groove; and, a torque applying device having a spring for applying to the screw member a torque by which the screw member is rotated so as to move toward the guide groove.

2. A slide type guide mechanism according to claim 1, wherein the threaded hole extends in a direction crossing the first and second guide side surfaces.

3. A slide type guide mechanism according to claim 1, wherein the torque applying device comprises a fixed support member which is fixed to the guide; and, wherein said spring is a torsion coil spring disposed around an axis of the screw member and connected at one end thereof to the fixed support member and at the other end thereof to the screw member.

4. A slide type guide mechanism according to claim 3, wherein the fixed support member is adapted to be fixed to the guide in a state in which the fixed support member has been rotated about the axis of the screw member to tighten the torsion coil spring.

5. A slide type guide mechanism according to claim 4, wherein the screw member has an externally extending portion positioned outside the guide, wherein the fixed support member is disposed concentrically around the externally extending portion and the torsion coil spring is wound around the externally extending portion and positioned between the externally extending portion and the fixed support member.

6. A slide type guide mechanism according to claim 5, wherein the fixed support member has a fixing member which engages with the fixed support member and the guide to fix the fixed support member to the guide in a state in which the fixed support member is set at a required angle about the axis of the screw member.

7. A slide type guide mechanism according to claim 6, wherein the fixing member comprises a pin attached to one of the guide and the fixed support member, and the other of guide and the fixed support member has a hole formed therein in which the pin engages.

8. A slide type guide mechanism according to claim 5, wherein the externally extending portion of the screw member is provided at the end surface thereof with a locking member extending transversely with respect to the axis of the screw member to extend out of the end surface, and the fixed support member has a retaining portion which engages with the locking member to stop the screw member from rotating about the axis of the screw member when the screw member has been rotated a certain angle about the axis of the screw member by the torque.

9. An electric drill unit comprising:
a support frame;
an electric drill supported by the support frame; and,
a slide type guide mechanism according to claim 1 for slidably guiding the electric drill with respect to the support frame, wherein the guide is secured to the support frame and the electric drill is secured to the slide.

10. An electric drill unit according to claim 9, wherein the electric drill comprises:
an electric motor;
an arbor having a distal end to which a cutting tool is attached and an axis about which the arbor is rotatably driven by means of the electric motor;
a tank for storing cutting oil;
an oil supply ring disposed around the arbor at the distal end of the arbor or in the vicinity thereof and fixed to the support frame; and,
an oil supply unit for supplying the cutting oil from the tank via the oil supply ring into the arbor, the oil supply unit comprising:
an oil supply hole in the oil supply ring which extends from the outer surface through the inner surface of the oil supply ring;
an oil supply hole in the arbor which extends from the outer surface through the inner surface of the arbor;
an oil supply pipe extending from the tank to the oil supply hole in the oil supply ring.

* * * * *